April 1, 1958                 W. E. SEGL               2,829,049
METHOD FOR THE DISINTEGRATION
OF CELLULOSE-BEARING MATERIAL
Filed Feb. 8, 1954                             2 Sheets-Sheet 1
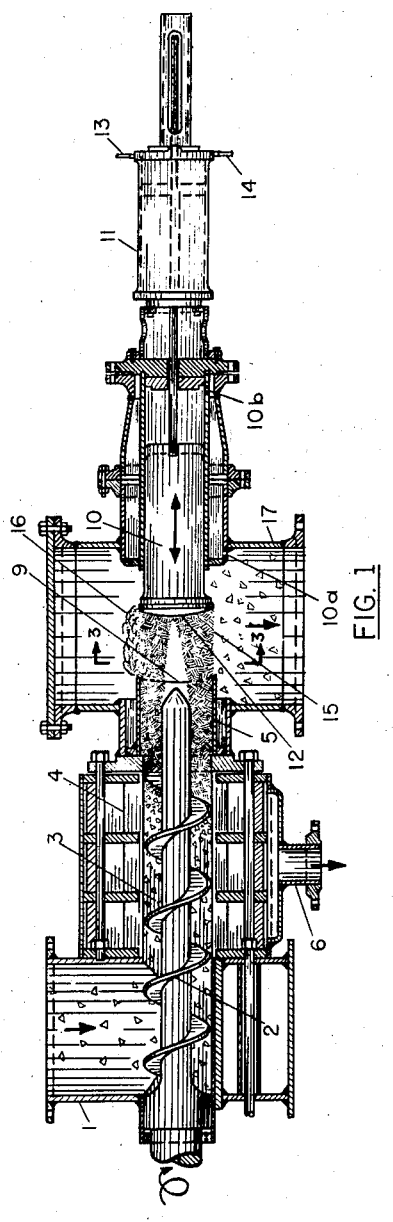
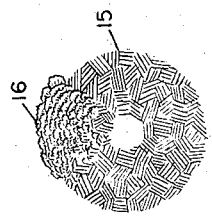
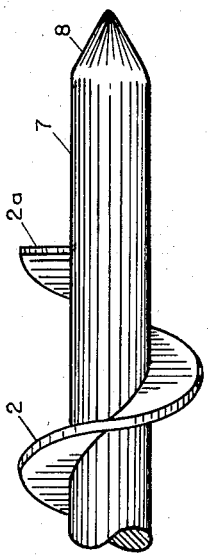
WALTER E. SEGL
*INVENTOR.*
BY     Ernest G. Peterson
AGENT.

April 1, 1958 W. E. SEGL 2,829,049
METHOD FOR THE DISINTEGRATION
OF CELLULOSE-BEARING MATERIAL
Filed Feb. 8, 1954 2 Sheets-Sheet 2

WALTER E. SEGL
*INVENTOR.*

BY *Ernest G. Peterson*

AGENT.

United States Patent Office 2,829,049
Patented Apr. 1, 1958

2,829,049

METHOD FOR THE DISINTEGRATION OF CELLULOSE-BEARING MATERIAL

Walter E. Segl, Wilmington, Del., assignor to Hercules Powder Company, Wilmington, Del., a corporation of Delaware Application February 8, 1954, Serial No. 408,676

8 Claims. (Cl. 92—6)

This invention relates to the purification of cellulose-bearing materials and more particularly to improvements in the art for charging and discharging such cellulosic material into and from continuous processing equipment.

In the production of purified cellulose suitable for the many fields in which cellulose is used, and especially for the preparation of cellulose derivatives, a high quality of end product is required as well as high capacity production. The latter requires continuous processing technique wherein the processing zone or zones are maintained at a pressure other than atmospheric and usually superatmospheric. Accordingly, it is necessary to maintain a pressure-resistant compact or plug of the material being continuously charged into the processing zone and, in many instances, it is desirable to maintain such a compact or plug for discharge of processed material from the processing zone. However, it is very necessary to disintegrate the pressure-resistant compact or plug so that processing medium employed in the processing zone can effectively contact the cellulosic material being processed to impart thereto certain desired physical and chemical effect. Although numerous processes and types of apparatus exist for continuously forming a pressure-resistant compact and charging material therefrom to or from a pressurized treatment zone, the problem in handling a cellulosic material is considerably more difficult. This is due to the fact that cellulosic materials after being formed into a compact tend to retain knots and lumps unless very effectively disintegrated. For example, a cotton linters compact when extruded against an apex or conical surface for disintegration breaks into masses containing knots and lumps. Unless these knots and lumps are further disintegrated by some effective auxiliary means, the purified cellulose obtained therefrom contains a high "pill count" which makes the cellulose unsuitable for many uses unless further processed or blended with high quality material.

Therefore, the principal object of this invention is to provide an improved method for forming and disintegrating a pressure-resistant compact of cellulosic material which is substantially free from knots and lumps.

Another object of this invention is to provide an improved method for very effectively disintegrating a pressure-resistant compact of cellulosic material which is simple, economical, reliable and gives uniiformity in operation.

Other objects of the invention will appear hereinafter, the novel features and combinations being set forth in the appended claims.

Generally described, in accordance with this invention there is provided a method for forming and disintegrating a pressure-resistant compact of cellulosic material which comprises continuously forming a pressure-resistant compact of cellulosic material in a compression zone; continuously extruding the pressure-resistant compact from the compression zone in the form of an annular body; and continuously disintegrating at least one substantially linear section of the body being continuously extruded from the compression zone.

In the accompanying drawings, which form a part of the specification, and wherein reference symbols refer to like parts wherever they occur:

Fig. 1 is a diagrammatic, sectional view of one form of apparatus for practice of the invention;

Fig. 2 is an enlarged, fragmentary, elevational view of the single-flight screw depicted in Fig. 1;

Fig. 3 is an enlarged, sectional view showing disintegration of one linear section of the extruded cellulosic material and is taken along line 3—3 of Fig. 1;

Figure 4:
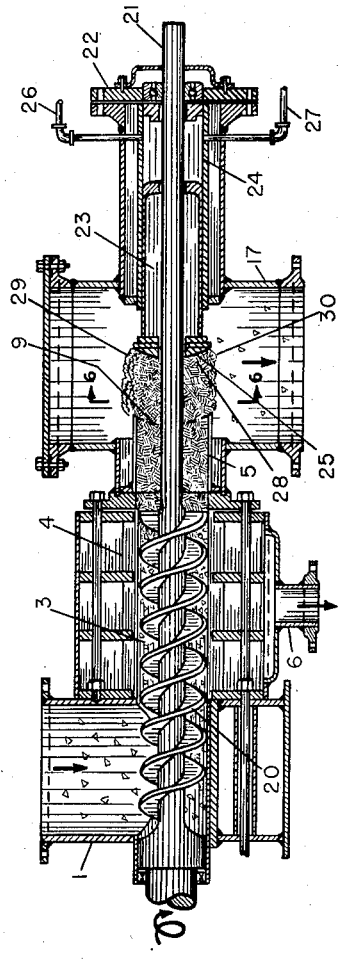
Fig. 4 is a diagrammatic, sectional view of another form of apparatus for practice of the invention.

In accordance with one embodiment of the invention and referring particularly to Figs. 1, 2, and 3, wetted cellulosic material, such as cotton linters, is charged through a conduit 1 which is in communication with a driven single-flight screw 2 in which the flight terminates with a radial edge 2a. The screw 2 gathers the cellulosic material and passes it into a compression zone 3 which includes a bar cage arrangement 4 and a forming tube 5. As the material is compressed in the compression zone 3, it is formed into a pressure-resistant compact and any excess liquid in the cellulosic material is expelled and passes through openings in the bar cage arrangement 4 and is withdrawn through a conduit 6. As the material is further progressed by the screw 2, it is still further compressed and is forced around the extended shaft 7 of the screw 2. The extended screw shaft 7 terminates with a tapered nose 8 and the extended shaft and nose extend substantially the length of the forming tube 5. The egress end of the forming tube 5 is provided with a seat 9 for a pressure-actuated ram 10 which is operated by fluid medium, such as air, supplied to a pressure cylinder 11. As the screw 2 continues to rotate, the cellulosic material is extruded from the forming tube 5 in the form of an unsupported annular body and forces the pressure-actuated ram 10 backwards thereby providing a linear body of substantially annular material between the end of the forming tube 5 and the face 12 of the ram 10. The pressure on the ram 10 is regulated by passing fluid medium to and from the cylinder 11 by means of lines 13 and 14, respectively. In the event the pressure-resistant compact of the material fails within the compression zone 3, the ram 10 moves forward and the face 12 thereof engages the seat 9 thereby preventing a blow-back of material through the conduit 1 when charging, for example, into a zone of higher pressure. As the screw 2 continues to rotate, the linear body of material, represented by 15, between the forming tube 5 and the ram 10 is subjected to compressive force wherein the leading surface 2a of the single-flight screw 2 in conjunction with the ram pressure causes a substantially linear section, represented by 16, of said body of material to disintegrate. As the screw 2 continues to rotate, the linear body of material is continuously built up and linear sections thereof are continuously disintegrated. With reference to Fig. 1, it will be noted that although the extruded body is substantially annular throughout its length, it tends to neck down and form over at the face of the ram. However, disintegration of cellulosic material in accordance with this embodiment is very thorough and effective. The cellulosic material thus disintegrated passes through a conduit 17 which is usually in communication with suitable digestion equipment maintained under superatmospheric pressure.

Figure 6:
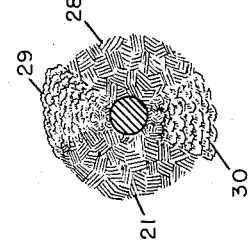
Fig. 6 is an enlarged, sectional view showing disintegration of two linear sections of the extruded cellulosic material and is taken along line 6—6 of Fig. 4.
Figure 5:
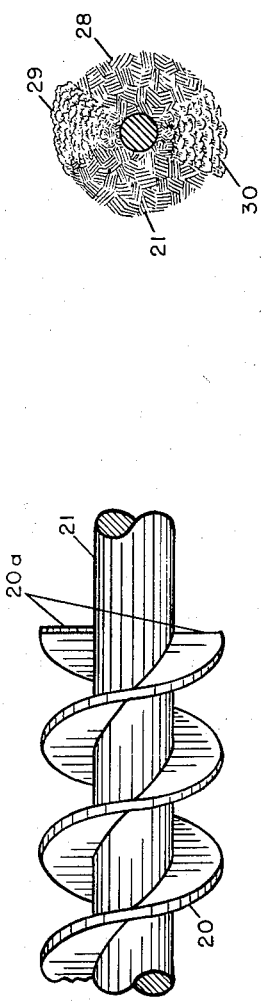
Fig. 5 is an enlarged, fragmentary, elevational view of the double-flight screw depicted in Fig. 4.

In accordance with another embodiment of the invention and referring now particularly to Figs. 4, 5, and 6, wetted cellulosic material is charged through a conduit 1 which is in communication with a driven double-flight screw 20 in which the flights terminate with radial edges 20a. The screw 20 gathers the cellulosic material and passes it into a compression zone 3 which includes a bar cage arrangement 4 and a forming tube 5. As the material is compressed in the compression zone 3, it is formed into a pressure-resistant compact and any excess liquid in the cellulosic material is expelled and passes through openings in the bar cage arrangement 4 and is withdrawn through a conduit 6. As the material is further progressed by the screw 20, it is still further compressed and is forced along the extended shaft 21 of the screw 20. The extended shaft 21 has a journal assembly 22 for suitable support of the shaft at the end opposite the screw flight. The egress end of the forming tube 5 is provided with a seat 9 for a pressure-actuated ram 23 which is concentric with the shaft 21 and which is operated by fluid medium, such as air, supplied to a pressure cylinder 24. As the screw 20 continues to rotate, the cellulosic material is extruded from the forming tube 5 in the form of a supported annular body and moves along the shaft 21 forcing the pressure-actuated ram 23 backwards thereby providing a linear body of supported annular material between the end of the forming tube 5 and the face 25 of the ram 23. The ram 23 is suitably splined to the cylinder 24 to prevent rotation of the ram with the screw shaft 21. The pressure on the ram 23 is regulated by passing fluid medium to and from the cylinder 24 by means of lines 26 and 27, respectively. In the event the pressure-resistant compact of the material fails within the compression zone 3, the ram 23 moves forward and engages the seat 9 as previously described in connection with the preceding embodiment of the invention. As the screw 20 continues to rotate, the linear body of material, represented by 28, between the forming tube 5 and the ram 23 is subjected to compressive force wherein the two leading surfaces 20a of the double-flight screw 20 in conjunction with the ram pressure causes two substantially linear sections, represented by 29 and 30, of said body of material to disintegrate. As the screw 20 continues to rotate, the linear body of material is continuously built up and double linear sections thereof are continuously disintegrated. Disintegration of cellulosic material in accordance with this embodiment is also very thorough and effective and the cellulosic material thus disintegrated is passed through a conduit 17 and into suitable digestion equipment as set forth for the preceding embodiment.

It has been found, generally, that either a single-flight or double-flight screw having a diameter in the order of 12 inches and a total flight length in the order of 5 feet gives very satisfactory results. With such an arrangement, approximately the first 2 feet of the flight length is used for inlet with the remainder of the flight length disposed within the bar cage. A radial bar cage is preferred with openings between the bars in the order of about 0.050 inch and a suitable length for the forming tube is in the order of length equivalent to the diameter of the screw. When using the tapered nose screw depicted in Figs. 1 and 2, the screw shaft is terminated near the end of the forming tube to allow the ram to adequately seat against the seat provided at the end of the tube. The ram face may be flat but it is preferable to have a slight convex surface for the face thereof to provide a better seal in the event of a blow-back.

For the ram depicted in Fig. 1, by-pass apertures 10a and 10b are provided for pressure equalization from a zone of high pressure, for example. Under such conditions the pressure on the ram may be varied from about 10 to about 50 p. s. i. g. Alternatively, for the ram depicted in Fig. 4, hydraulic fluid under a differential pressure of the above magnitude may be employed. The length of the annular body maintained between the forming tube and the face of the ram is between from about 6 to about 15 inches. A highly desirable feature of the screw resides in terminating the screw flight in a straight radial edge. This feature is shown more particularly in Figs. 2 and 5 for the single-flight and double-flight screws, respectively. This sharp leading edge continuously exerts a rotating high compression stress on the body of material disposed between the forming tube and the ram face which causes successive disintegration of substantially linear sections or segments of the material. It has been found that such disintegration is very thorough and effective for subsequent processing. Furthermore, it has been found that the screw flights may be of uniform pitch or variable pitch and give satisfactory results. From the foregoing, it is evident that there are several factors which will influence conditions for the most satisfactory operation of the invention, the actual limits of which can be determined only by consideration of the starting materials involved and the intermediate and the finished products desired.

In operation of the invention for a continuous system, the cellulosic starting material is subjected to the usual preparation treatment. For example, wood, straw, and other bulk cellulose-containing materials are reduced to chips or shreds and screened. Preferably, the chips or like material to be treated will have at least one thickness in the order of ¼ inch and will pass a ¾-inch mesh screen. Raw linters and similar fibrous cellulosic material are simply subjected to the usual bale opening facilities. Ground wood pulp or chemical wood pulp may be used without additional preparation where in the former instance substantially complete digestion is desired and in the latter further digestion treatment for special end product use. The cellulosic starting material after suitable preparation, if necessary, is then weighed by a constant weight feed device and a pretreatment solution of water or water and chemicals is thoroughly mixed with the material in a pretreatment zone. The pretreatment solution may be water to serve as a lubricant for the wetted material, or it may be water and chemicals in which the latter may be acid or alkaline digestion medium, with or without wetting agent, detergent, or other digestion aid or bleaching medium, or like chemical agents. These chemicals may be employed as desired to effect certain desired conditioning prior to actual digestion. It is desirable that an excess of the pretreatment solution be present to insure positive wetting of the material and adequate lubrication. The material from the pretreatment zone is continuously passed into a first compression or compaction zone in accordance with this invention wherein excess pretreatment solution is squeezed from the material as it is formed into a pressure-resistant compact. The material from the compression zone is extruded therefrom in the form of an annular body which forces the ram backwards to a point at which a substantially linear section or segment of the body is continuously broken therefrom. In this manner very effective continuous disintegration of the compacted material is attained and the material thus disintegrated is passed into a digestion zone maintained under conditions of continuous agitation, superatmospheric pressure and temperature. The quantity and type of chemicals used, the pressure and temperature, and length of the digestion period may be varied according to the yield and quality of the cellulose desired. After digestion, the digested material is then passed into a second compression or compaction zone in accordance with this invention wherein excess digestion liquid is squeezed from the digested material as it is formed into a pressure-resistant compact. The material is then disintegrated as hereinbefore described or it may be blown to substantially atmospheric pressure depending upon the type of system employed. The discharged material may then be washed, bleached, sheeted, or bulk dried, or otherwise suitably processed as desired for subsequent use.

In accordance with this invention the raw material may be a cellulose-bearing material such as comminuted wood, for example, wood chip and wood waste, wheat straw, bagasse and other agricultural residues, cotton linters, and pulps requiring further refinement. Furthermore, the method for forming and disintegrating a pressure-resistant compact of such cellulosic materials in accordance with this invention, either for charging into or discharging from a digestion zone, affords certain advantages in conjunction with digestion which represent a marked improvement in the art. For example, the raw material may be defibrated prior to digestion or subsequent to digestion as desired and satisfactorily charged or discharged and disintegrated. The pretreatment liquid may be chemically inert such as water, or may be a chemically active aqueous solution containing chlorine, sodium sulfide and hydroxide, sulfurous acid and a bisulfite, sodium hydroxide and the like. Therefore, the pretreatment liquid may be water per se, or bleach solution such as aqueous hypochlorite, or digestion solution such as aqueous sodium hydroxide. The digestion liquid may be an aqueous solution of any of the chemically active agents hereinbefore referred to for pretreatment depending on the raw material involved. Generally, the quantity and type of chemicals used, the pressure and temperature, and length of the digestion period may be varied according to the yield and quality of the cellulose desired. In accordance with a preferred embodiment of this invention, wherein the raw material is cotton linters, the pretreatment liquid may range from a weak to a strong aqueous solution of caustic alkali, that is, from about 0.5 to about 7% and higher, say, up to 15%, depending on the quality of the starting material and quality of the cellulose desired. The digestion liquor may be an aqueous solution comprising from about 0.5 to about 10% caustic alkali with digestion carried out under a steam pressure from about 25 to about 175 pounds gage per square inch at a temperature from about 266° to about 377° F. During digestion, the ratio of digestion liquor to linters may be maintained from about 1:1 or even less to about 5:1 with satisfactory operation, and from the standpoint of economy the lowest possible liquor to linters ratio, say, approaching a 1:1 ratio, is used. Detergents, wetting agents, and other digestion aids may be added to the digestion liquor or added to the digester to aid in the removal of undesirable material during digestion. Similarly, in the sulfite, soda, and sulfate processes which constitute the major proportion of chemical pulps, conventional digestion chemical and moderants may be utilized in conjunction with this invention with distinct benefit. This is more readily seen in reference to the advantages of the invention. For example, the pretreatment step affords thorough wetting and lubrication for charging the material and may include some chemical action if desired. It has been pointed out above that a low liquor to linters ratio is desirable for economic reasons, and it is possible to use far lower ratios on a commercial basis in accordance with this invention than heretofore possible. One reason for this improvement is the thorough and uniform distribution of a small amount of liquor through the mass of cellulosic material that is accomplished by the action of the charging screw in squeezing out excess liquor followed by thorough and effective disintegration of the mass. Furthermore, due to the very thorough and effective disintegration of the formerly compacted cellulosic material in accordance with this invention, the heat distribution and contact of the material with chemical throughout the digestion step is exceptionally uniform and thorough so that low liquor to cellulose ratios, increased chemical concentration, and reduced time of digestion may be employed. Additionally, chemical concentration may be varied throughout the digestion zone by providing intermediate points for charging dilution or concentration medium to the zone as desired. Excess solution, if present, may be removed from the digested material during discharge so that the chemicals can be recovered or re-used before being diluted with copious amounts of water which entail additional expense in recovery of chemical or concentration for re-use.

It will be seen, therefore, that the advantages of this invention are multifold. The very thorough and effective disintegration of compacted cellulosic material as obtained in accordance with the method of this invention affords great latitude in processing conditions and affords a highly desirable uniform material for charging to digestion equipment. Additionally, upon discharge from such equipment, the method of this invention may be used to properly condition cellulosic material for subsequent treatment including washing, bleaching, defibration, or similar desired aftertreatment procedures.

Although the present invention has been described more particularly in respect to cotton linters with specific details for the digestion of this cellulosic material, it is not intended that these details shall be regarded as limitations upon the scope of the invention since the invention may be employed where chemical reaction is desired such as in esterification and etherification reactions. Therefore, it is not intended that the scope of this invention be limited, except in so far as included in the accompanying claims.

This invention is a continuation-in-part of my copending application, Serial No. 253,521, filed October 27, 1951, now Patent No. 2,673,690, which in turn is a continuation-in-part of my copending application, Serial No. 104,616, now abandoned, filed July 14, 1949.

What I claim and desire to protect by Letters Patent is:

1. The method for forming and disintegrating a pressure-resistant compact of cellulosic material which comprises continuously forming a pressure-resistant compact of cellulosic material in a compression zone; continuously extruding the pressure-resistant compact from the compression zone in the form of an annular body against a pressure-actuated ram; and successively disintegrating the compact so formed by continuously extruding said compact as a body of sufficient strength to force said ram backward with continued lengthening of said compact to a point at which a substantial portion of the entire length of said compact is instantly disintegrated into fragments after which said ram moves forward to engage a new portion of said continuously extruded compact.

2. The method for forming and disintegrating a pressure-resistant compact of cellulosic material which comprises continuously forming a pressure-resistant compact of cellulosic material containing liquid in a compression zone; continuously extruding the pressure-resistant compact from the compression zone in the form of an unsupported, annular body against a pressure-actuated ram; and successively disintegrating the compact so formed by continuously extruding said compact as a body of sufficient strength to force said ram backward with continued lengthening of said compact to a point at which a substantial portion of the entire length of said compact is instantly disintegrated into fragments after which said ram moves forward to engage a new portion of said continuously extruded compact.

3. The method for forming and disintegrating a pressure-resistant compact of cellulosic material which comprises continuously forming a pressure-resistant compact of cellulosic material containing liquid and removing any excess liquid therefrom in a compression zone; continuously extruding the pressure-resistant compact from the compression zone in the form of an unsupported annular body against a pressure-actuated ram; and successively disintegrating the compact so formed by continuously extruding said compact as a body of sufficient strength to force said ram backward with continued lengthening of said compact to a point at which a substantial portion of the entire length of said compact is instantly disintegrated into fragments after which said ram moves forward to engage a new portion of said continuously extruded compact.

4. The method in accordance with claim 3 in which the cellulosic material is cotton linters.

5. The method in accordance with claim 3 in which the cellulosic material is comminuted wood.

6. The method in accordance with claim 3 in which the cellulosic material is wheat straw.

7. The method in accordance with claim 3 in which the cellulosic material is bagasse.

8. The method in accordance with claim 3 in which the cellulosic material is pulp requiring further refinement.

References Cited in the file of this patent

UNITED STATES PATENTS

| Number | Name | Date |
|---|---|---|
| 848,484 | Newnham | Mar. 26, 1907 |
| 1,048,853 | Muntzing | Dec. 31, 1912 |
| 1,170,487 | Marsden | Feb. 1, 1916 |
| 1,906,088 | Parsons | Apr. 25, 1933 |
| 1,915,812 | Wollenberg | June 27, 1933 |
| 2,054,301 | Richter | Sept. 15, 1936 |
| 2,059,435 | Brownlee | Nov. 3, 1936 |
| 2,159,258 | De La Rosa | May 23, 1939 |
| 2,321,015 | Davis | June 8, 1943 |
| 2,374,363 | McCaskell | Apr. 24, 1945 |
| 2,425,024 | Beveridge et al. | Aug. 5, 1947 |
| 2,428,995 | Rogers | Oct. 14, 1947 |
| 2,673,690 | Segl | Mar. 30, 1954 |
| 2,698,789 | Segl | Jan. 4, 1955 |